United States Patent Office 3,293,344
Patented Dec. 20, 1966

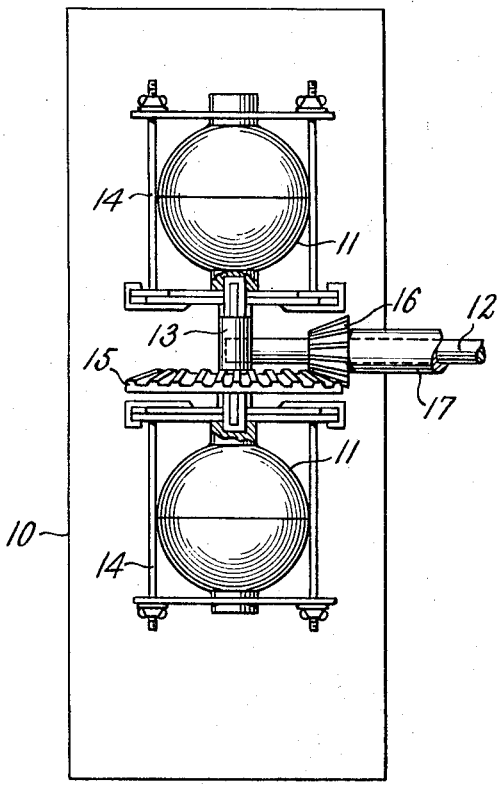

3,293,344
ROTATIONAL MOLDING METHOD
Gerald L. Barnes, South Bend, and John S. Bruner, Mishawaka, Ind., assignors to United States Rubber Company, New York, N.Y., a corporation of New Jersey
Filed June 17, 1963, Ser. No. 288,501
9 Claims. (Cl. 264—302)

This invention relates to a method of molding hollow articles from plasticized thermoplastic resin.

It has long been known that hollow articles such as balls, dolls, shoes, etc. can be molded from liquid polymer systems, such as rubber or vinyl resins. For example, United States Patent 1,998,897, granted April 23, 1935, to Kay, discloses a "rotational casting" method of manufacturing hollow articles from a heat sensitive latex. In this method a measured charge of the heat sensitive latex is deposited in a closed mold which is then rotated in a plurality of planes. As the mold rotates the latex flows over the inner molding surfaces of the mold. Simultaneously with the rotation of the mold, heat is applied thereto to gel the latex in the form of a thin skin on the inner walls of the mold. The gelled product is subsequently removed from the mold.

With the advent of vinyl resin plastisols these compounds were used in this rotational casting technique. Plastisols and their use are well known to those skilled in the art; see for example Modern Plastics, volume 26, page 28 (April 1949), by Perrone and Neuwirth. To rotationally cast a plastisol, a measured charge of plastisol is deposited in a closed mold, and the mold is rotated in a plurality of planes while the plastisol is heated to flux the same as a thin skin on the inner wall of the mold. The skin is then cooled down, and the molded article removed from the mold. See "A Survey of Literature and Patents Pertaining to Vinyl Plastisol Technology and Rotational Casting," by Whittington (1961, Smail Creative Printing, Inc., Ashland, Ohio).

Alternatively, hollow articles have been cast from plastisols by the so-called "slush molding" technique as disclosed, for example, in United States Patent 2,974,373, granted March 14, 1961, to Streed et al. In the "slush molding" technique a hollow mold is filled completely with plastisol after which heat is applied to the plastisol in the mold to gel a thin skin of resin on the inner walls of the mold. After the skin has been gelled, the excess plastisol is poured from the mold, and the mold with the skin adhering to the inner surface is then further heated to complete the fluxing of the plastisol. The skin is then cooled down, and the molded article removed from the mold.

This invention relates to a novel rotational casting process for producing hollow articles. Dry solids, if of suitably small size, behave in somewhat the same manner as liquids in certain applications. This dry fluent flow is used in this invention.

According to this invention, a hollow mold is charged with a charge of vinyl resin particles of sufficiently small size that the charge is fluent within the mold. The mold is then rotated in a plurality of planes and simultaneously the resin particles are heated within the mold to coalesce and sinter the particles into a layer on the internal wall of the mold having the shape desired in the molded product. If an excess of resin has been charged into the mold, this excess may be removed, for example through an opening in the molded product, after the skin has gelled but before the resin has completely dissolved in the plasticizer.

Suitable vinyl resins which can be used in this invention, such as polyvinyl chloride, or any combination thereof with any of the following resins, or any combination of the following resins: copolymers of vinyl chloride and vinyl acetate, polyvinylidine chloride, copolymers of vinyl chloride and diethyl maleate, copolymers of vinyl chloride and vinylidine chloride; and plasticizers therefor, are well known to those in the plastics art.

Several distinct embodiments of this molding technique are embraced within the instant invention as will become apparent from the detailed description of specific embodiments thereof hereinafter contained. Each of these embodiments employ charges of dry solids of small particle sizes; and the preferred systems employ particles of prefused compounds of resin and plasticizer.

Various techniques are well known for fusing vinyl resins and plasticizers therefor. For example they may be fused on mills, mixed and fused in a Banbury etc. The fused compounds may, as in the case of milled compounds, be chopped to a relatively coarse particle size, say up to about ⅛ cubic inch in volume. If desired, these coarse particles may be used in this process as disclosed in application Serial No. 288,500, of Mankowich, Varenelli, and Heinricks, titled "Rotational Molding Method," filed June 17, 1963. It is preferred, however, to further reduce these particles in size and for many applications to pulverize these particles before using them, and this may be done on various pieces of equipment. For example, prefused vinyl may be ground in equipment known as a Mikro Pulverizer, type CF, made by the Pulverizing Machinery Division of the Metals Disintegrating Company, Summit, New Jersey. This pulverizer is of conventional hammermill type design in which the particles of chopped, prefused vinyl are hurled against a grated screen surface by the action of rotating hammer heads. It is very desirable, when dealing with prefused thermoplastic vinyl compositions, to cool the prefused, chopped particles so that they will shatter or break into very small particles (pulverize) of the mesh size or range desired. This may be accomplished by feeding particles of Dry Ice ($CO_2$) into the Mikro Pulverizer along with the chopped, prefused vinyl particles. Depending on the speed with which the materials are fed into the Mikro Pulverizer the amount of Dry Ice will vary. It is desirable to feed sufficient quantities with the vinyl material to maintain a vinyl temperature of approximately 0° C. or lower. With larger or other types of size reduction equipment, cooling may be effected by passing large amounts of air through the equipment which prevents the softening of the vinyl material, thereby preventing its clogging.

Materials may be used in this invention, and products can be produced by it, which have not generally been used or produced in prior methods. For example, some plasticizers for vinyl resins are extremely thick, viscous materials (the G–41 referred to hereinafter is one such) and are difficult to use in conventional plastisol slush casting techniques because the mixture is not sufficiently fluid. These materials offer advantages for many applications; for example, the thick, viscous plasticizer last mentioned is not readily extractable by gasoline—most gas resistant polymeric plasticizers are very thick and viscous—and it is a desirable plasticizer for fuel containers. These materials can readily be used in this invention to produce desirable end products. Further, lower plasticizer content articles, generally, can be made with this technique compared with those made from liquid plastisol system using the same plasticizer.

In one embodiment, a mold is first coated internally with a plasticizer for thermoplastic resin. For example, a polyester plasticizer may be applied to the internal walls of the mold. If desired, it may be thinned with a suitable solvent to facilitate spreading the plasticizer over the inner surface of the mold. Also, if desired, a thin film of silicone fluid may be coated on the mold in place of the plasticizer.

The figure of the drawing is an elevational view of apparatus useful in practicing the method of this invention.

Two spherical molds 11 rotate within an oven indicated in outline at 10. A rotatable shaft 12 extends into oven 10 and carries on its end a support 13 for two openable clamp carriers 14 journaled on support 13 and each adopted to clampingly receive the two halves of each spherical mold 11. Fixed to carriers 14 are gears 15 (only one is shown in the drawing) that mesh with a gear 16 on a sleeve 17 about shaft 12. As shaft 12 rotates molds 11 are revolved about the axis of shaft 12. At the same time, gear 16, which may be stationary or suitable rotated, causes the molds to rotate additionally about their own axes.

A measured charge of particles of prefused polyvinyl chloride and a plasticizer therefor, which, for example, has been fused on a mill and subsequently ground to the relatively small particle size of 35 mesh, or smaller, in a Mikro Pulverizer as above described, is charged into the cold mold. The mold is then closed and rotated cold in a plurality of planes until the entire inner surface of the mold is coated with a layer at least one particle thick of the pulverized plastisol which adheres to the inner walls of the mold because of the mold coating of plasticizer or silicone fluid on the mold's inner walls. The mold is then further rotated in a plurality of planes while in an oven, for example at a temperature between 400 and 500° F., for a period of time, for example 25 minutes, sufficient for the thermoplastic resin particles to become at least semi-fluid and to coalesce into an essentially impermeable wall material of constant thickness. Also, during this heating, the particles of plasticized prefused resin are solvated by plasticizer in the coating on the walls of the mold when a plasticizer is used for that coating.

Thereafter the article is cooled below the melting temperature of the resin, and removed from the mold.

A second embodiment, which also utilizes a plasticized resin which has a prior heat history and therefore is one of the preferred processes, is as follows. In this process a thermoplastic resin is mixed with a plasticizer and fused. The fused compound is then pelletized or chopped into small pieces, and subsequently pulverized as described above. A measured charge of this prefused compound is then charged into a hollow mold the walls of which have not, however, been previously coated with plasticizer or silicone fluids, and the mold is rotated, while being heated, in a plurality of planes to distribute the particles over the inner surface of the mold and coalesce and sinter them into the article desired to be molded therein. Following this, the mold is cooled below the melting temperature of the resin, and the molded article is removed.

The following specific example will further illustrate this second embodiment. In the following formulation all parts given are by weight. 100 parts of polyvinyl chloride resin (Marvinol VR–24) are mixed with 75 parts of a plasticizer [either polymeric plasticizer Paraplex G–41 or monomeric plasticizer di(2 ethyl hexyl phthalate)], 5 parts of a dibasic lead phosphite stabilizer, .5 part of a lead stearate stabilizer, 1.0 part of a stearic acid compound processing aid and, if desired, 1 part of carbon black as pigment, are mixed in a standard Hobart mixer. [Paraplex G–41, made by Rohm & Haas, is prepared by reacting a dibasic acid with a polyhydric alcohol so that a molecular weight of approximately 7,000 is attained; it has an acid number of 2.0, a specific gravity at 25° C. of 1.132, a refractive index at 25° C. of 1.4696 and a solidification temperature of −25° C.]

The mixed compound is then fused on a mill. Alternatively, if desired, it may be mixed in a Banbury and fused. For example it may be milled, or Banbury mixed, at 300 to 325° F. for 30 minutes to flux the resin and plasticizer. If fused on a mill, the compound is sheeted off the mill in gauges ranging from .10″ to .125″. The sheet is then pelletized or chopped into small pieces approximately ¼″ x ½″ by the thickness of the sheet. Chopped particles of this size could be used as the measured charge for the mold as described hereafter or in the aforesaid co-pending application. Desirably, however, the chopped particles are further pulverized in a Mikro pulverizer, and the chopping referred to last above is done merely to facilitate the pulverizing or pelletizing operation. In the preferred embodiments these particles are pelletized to a powder-like material ranging in mesh size from about 50 to about 200 mesh. Distribution of particle size throughout the mesh range is desirable. For some usages, the particles may be as large as ¼″ or ½″ cubes as pointed out in said co-pending application but, when pulverized, desirably range from about 10 mesh to as fine as about 250 mesh.

The pulverized material is then charged into the mold, and the mold is rotated in a plurality of planes and heated. The heating time and temperature will depend upon the wall thickness and size of article to be molded. Generally, temperatures of 400 to 500° F. and rotational cycles of 15 to 30 minutes will be adequate for hollow bodies, such as liquid containers, ranging in volume from 1 to 25 gallons. Thereafter the mold is cooled and the molded article is removed.

A thermoplastic resin-plasticizer composition without a substantial prior heat history i.e. an unfused compound, is used in the following example. In this embodiment the mold should be coated with a plasticizer on its internal walls as in the first embodiment. A dry blend of thermoplastic resin particles, such as commercially available polyvinyl chloride resin patricles, a suitable palsticizer therefor and, if desired, other compounding ingredients, are intimately intermixed, but they are not fused. A measured charge of this unfused blend, is charged into a rotatable mold which, as in the first embodiment, is rotated in a plurality of planes while it is heated in an oven to distribute the same over the walls of the mold in a layer and to fuse the resin and plasticizer into the form of the article desired to be molded. Thereafter the layer is cooled below the melting temperature of the resin, and the article is withdrawn from the mold.

The following specific example will further illustrate this last mentioned example. 100 parts by weight of polyvinyl chloride resin powder (Marvinol VR–34), 75 parts by weight of plasticizer [either a polymeric type such as Paraplex G–41, or a monomeric plasticizer such as di(2 ethylhexyl phthalate)], 5 parts by weight of a dibasic lead phosphite stabilizer (Dyphos, made by National Lead Company, of New York, N.Y.), .5 part by weight of a lead stearate stabilizer, 1.0 part by weight of a stearic acid compound processing aid and 1 part by weight of carbon black (pigment), are dry blended at room temperature in a muller mixer until a free-flowing powder is obtained. A measured charge of suitable amount, depending upon the wall thickness desired, the size of the mold, and the like, of this blend is charged into a hollow metal mold, the mold is closed and rotated in a plurality of planes while being heated to fuse the resin and plasticizer over the same temperature range and time cycle as in the preceding embodiments to coalesce a film of the compound on the inner walls of the mold.

As pointed out above, the use of these techniques has certain distinct advantages over the conventional rotational casting of the prior art first discussed hereinabove. In some applications large plasticizer content in the finished product is undesirable. Thus in a tank for gasoline, the fuel can extract plasticizer and stabilizer from the tank, which materially deteriorates the cell and can cause clogging of an engine as the fuel contents are used. Using the dry prefused compounds, generally lower plasticizer content materials can be used.

Furthermore, the conventional process first hereinabove described requires the use of liquid stabilizers generally. These are generally solid stabilizers dispersed or dissolved in a suitable vehicle. The vehicle is generally readily extractable by hydrocarbon fuels so that they present a distinct disadvantage when used in containers for such fuels. Utilizing the dry process disclosed herein, solid powdered stabilizers can be used.

It is also possible to cast rigid containers using either of the embodiments employing prefused resin in which 15 parts or less of plasticizer have been used. In such products the resulting product can be very rigid.

Having thus described our invention, what we claim and desire to protect by Letters Patent is:

1. A method of making a hollow fuel tank of thermoplastic resin which comprises, coating the inner surface of a fuel tank mold with a plasticizer for the resin, depositing in the mold a fluent dry charge of particles of thermoplastic vinyl resin and a thick, viscous, fuel resistant plasticizer therefor, said charge being less in volume than the volume of said mold, rotating the mold in a plurality of planes while heating the charge to distribute it and fuse the same into a layer over the surface of the mold in the form of the fuel tank, cooling the material in the layer and removing the article from the mold.

2. The method of making hollow articles of plasticized thermoplastic vinyl resin which comprises, coating the inner surface of a mold with a plasticizer for the resin, depositing in the mold a dry fluent charge of thermoplastic vinyl resin particles, said charge being less in volume than the volume of said mold, rotating the mold in a plurality of planes to distribute the particles in a layer over the surface of the mold in the form of the object to be molded, heating the resin to flux the resin and plasticizer to form the article, cooling the article, and removing it from the mold.

3. The method of claim 2 wherein said thermoplastic vinyl resin is a fluxed mixture of plasticizer and vinyl resin, and wherein said mold is cold during a first part of its period of rotation to distribute said particles and wherein said resin is heated during a subsequent part of the mold's period of rotation to flux said resin and plasticizer.

4. The method of claim 3 including removing an excess part of the charge not required for the article from the mold after the said cold rotation of the mold but before the said rotation of the mold while heating the resin.

5. A method of making hollow articles of plasticized thermoplastic vinyl resin comprising, fluxing a thermoplastic vinyl resin and a plasticizer therefor, making small particles of said fluxed resin and plasticizer, depositing in a mold a fluent charge of the particles of the fluxed resin and plasticizer, said charge being less in volume than the volume of said mold, rotating the mold in a plurality of planes while heating the particles to distribute the compound and coalesce the particles into a layer over the surface of the mold in the form of the object to be molded, cooling the compound in the layer, and removing the article from the mold.

6. The method of claim 5 in which the particles so charged are particles not larger than ⅛ cubic inch in volume of fluxed vinyl resin and a plasticizer therefor.

7. The method of claim 6 in which the particles in the charge are puverized particles having a mesh size between about 10 and about 250 mesh.

8. The method of claim 7 in which the particles have a mesh size between about 50 and about 200 mesh.

9. The method of claim 8 in which the particles in the charge have sizes distributed within said mesh range.

References Cited by the Examiner

UNITED STATES PATENTS

| 3,030,668 | 4/1962 | Taylor | 264—311 |
| 3,059,281 | 10/1962 | Visser et al. | 265—302 |

FOREIGN PATENTS

| 589,477 | 12/1959 | Canada. |
| 654,128 | 12/1962 | Canada. |
| 500,298 | 2/1939 | Great Britain. |
| 585,395 | 2/1947 | Great Britain. |
| 905,546 | 9/1962 | Great Britain. |
| 911,646 | 11/1962 | Great Britain. |

ROBERT F. WHITE, *Primary Examiner.*

ALEXANDER H. BRODMERKEL, *Examiner.*

J. R. DUNCAN, S, A. HELLER, *Assistant Examiners.*